United States Patent
Ward et al.

(10) Patent No.: US 10,102,471 B2
(45) Date of Patent: Oct. 16, 2018

(54) CARRIER AND BAND ASSEMBLY FOR IDENTIFYING AND MANAGING A COMPONENT OF A SYSTEM ASSOCIATED WITH A WELLHEAD

(71) Applicant: S.P.M. Flow Control, Inc., Fort Worth, TX (US)

(72) Inventors: Ben Ward, Fort Worth, TX (US); Jeff Myers, Fort Worth, TX (US); Connor Landrum, Burleson, TX (US); Preston Smith, Dallas, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 0 days.

(21) Appl. No.: 15/233,647

(22) Filed: Aug. 10, 2016

(65) Prior Publication Data

US 2017/0046612 A1    Feb. 16, 2017

Related U.S. Application Data

(60) Provisional application No. 62/205,223, filed on Aug. 14, 2015.

(51) Int. Cl.
*G06K 19/077* (2006.01)
*E21B 41/00* (2006.01)
(Continued)

(52) U.S. Cl.
CPC ........ *G06K 19/07775* (2013.01); *E21B 41/00* (2013.01); *G06K 7/10366* (2013.01); *E21B 43/26* (2013.01)

(58) Field of Classification Search
CPC .................................................. G06K 19/0775
(Continued)

(56) References Cited

U.S. PATENT DOCUMENTS

| 2,007,203 A | 7/1935 | Kraeft |
| 2,191,782 A | 2/1940 | Valane |

(Continued)

FOREIGN PATENT DOCUMENTS

| AR | 84750 | 11/2012 |
| AU | 346763 | 2/2013 |

(Continued)

OTHER PUBLICATIONS

International Search Report and Written Opinion, dated Nov. 4, 2016, by the ISA/US, re PCT/US16/46364, 21 pages.
(Continued)

*Primary Examiner* — Allyson Trail
(74) *Attorney, Agent, or Firm* — Haynes and Boone LLP

(57) ABSTRACT

According to one aspect, an apparatus adapted to be connected to a component that is part of a pump system or a manifold trailer includes a block defining opposing first and second exterior surfaces. In one aspect, the block includes a recess formed in the first exterior surface and extending towards the second exterior surface, and an opening formed in the second exterior surface. In another aspect, the apparatus also includes an electronic identifying device at least partially accommodated within the recess, the device including a first portion having data stored thereon that provides identification of the component. In one aspect, the electronic identifying device further includes a second portion having data stored thereon that provides one of: information associated with certification of the component; and identification of the pump system or the manifold trailer of which the component is a part.

22 Claims, 10 Drawing Sheets

(51) Int. Cl.
*G06K 7/10* (2006.01)
*E21B 43/26* (2006.01)

(58) Field of Classification Search
USPC .............. 235/492; 340/854.1; 439/66; 702/6
See application file for complete search history.

(56) References Cited

U.S. PATENT DOCUMENTS

| | | | |
|---|---|---|---|
| 3,331,385 A | 7/1967 | Taylor | |
| 3,465,572 A | 9/1969 | Thomas | |
| 3,742,756 A | 7/1973 | Seager | |
| 3,808,879 A | 5/1974 | Rogers | |
| 4,044,833 A | 8/1977 | Volz | |
| 4,185,802 A | 1/1980 | Myles et al. | |
| 4,329,925 A | 5/1982 | Hane et al. | |
| 4,432,064 A | 2/1984 | Barker et al. | |
| 4,574,880 A | 3/1986 | Handke | |
| 4,866,607 A | 9/1989 | Anderson et al. | |
| 4,916,641 A | 4/1990 | Bybee | |
| 5,063,775 A | 11/1991 | Walker, Sr. et al. | |
| 5,105,881 A | 4/1992 | Thoms et al. | |
| D326,927 S | 6/1992 | Catalina | |
| 5,269,180 A | 12/1993 | Dave et al. | |
| 5,360,967 A | 11/1994 | Perkin et al. | |
| 5,372,195 A | 12/1994 | Swanson et al. | |
| 5,377,104 A | 12/1994 | Sorrells et al. | |
| D354,677 S | 1/1995 | Troyer | |
| D365,927 S | 1/1996 | Cho | |
| D368,218 S | 3/1996 | Klein, III | |
| 5,509,303 A | 4/1996 | Georgi | |
| D371,370 S | 7/1996 | Fenton et al. | |
| 5,722,490 A | 3/1998 | Ebinger | |
| D406,590 S | 3/1999 | Heiligenstein et al. | |
| D408,269 S | 4/1999 | Ross | |
| D408,716 S | 4/1999 | Vesledahl | |
| 6,123,394 A | 9/2000 | Jeffrey | |
| 6,346,886 B1 | 2/2002 | De La Huerga | |
| 6,434,500 B1 | 8/2002 | Boehne et al. | |
| 6,457,529 B2 | 10/2002 | Calder et al. | |
| 6,480,100 B1 | 11/2002 | Frieden et al. | |
| 6,567,752 B2 | 5/2003 | Cusumano et al. | |
| 6,592,822 B1 | 7/2003 | Chandler | |
| 6,597,175 B1 | 7/2003 | Brisco | |
| 6,648,606 B2 | 11/2003 | Sabini et al. | |
| D492,670 S | 7/2004 | Hung et al. | |
| D495,223 S | 8/2004 | Altman | |
| 6,820,694 B2 | 11/2004 | Willberg et al. | |
| 6,829,542 B1 | 12/2004 | Reynolds et al. | |
| 6,831,571 B2 | 12/2004 | Bartel | |
| 6,922,641 B2 | 7/2005 | Batzinger et al. | |
| 6,989,764 B2 | 1/2006 | Thomeer et al. | |
| 7,064,668 B2 | 6/2006 | Porad | |
| 7,069,776 B2 | 7/2006 | Tudor | |
| D527,378 S | 8/2006 | Raymond et al. | |
| 7,083,391 B2 | 8/2006 | Sievert et al. | |
| 7,096,718 B2 | 8/2006 | Matzner et al. | |
| 7,096,961 B2 | 8/2006 | Clark et al. | |
| 7,137,451 B2 | 11/2006 | Smith | |
| D535,982 S | 1/2007 | Inoue | |
| 7,159,654 B2 | 1/2007 | Ellison et al. | |
| D538,630 S | 3/2007 | Sergi | |
| 7,239,977 B2 | 7/2007 | Fantana et al. | |
| 7,242,317 B2 | 7/2007 | Silvers | |
| 7,259,675 B2 | 8/2007 | Baker et al. | |
| D551,662 S | 9/2007 | Buren et al. | |
| 7,267,798 B2 | 9/2007 | Chandler | |
| 7,272,529 B2 | 9/2007 | Hogan et al. | |
| 7,301,474 B2 | 11/2007 | Zimmerman | |
| 7,308,331 B2 | 12/2007 | Bjornson | |
| 7,383,882 B2 | 6/2008 | Lerche et al. | |
| 7,389,870 B2 | 6/2008 | Slappay | |
| D573,589 S | 7/2008 | Montgomery et al. | |
| 7,395,188 B1 | 7/2008 | Goebel et al. | |
| 7,400,263 B2 | 7/2008 | Snider et al. | |
| 7,412,898 B1 | 8/2008 | Smith et al. | |
| D578,521 S | 10/2008 | Sergi et al. | |
| 7,433,789 B1 | 10/2008 | Balestra | |
| 7,477,160 B2 | 1/2009 | Lemenager et al. | |
| 7,484,625 B2 | 2/2009 | Scott et al. | |
| D597,086 S | 7/2009 | Sergi et al. | |
| 7,557,716 B2 | 7/2009 | Morbitzer et al. | |
| D598,274 S | 8/2009 | Nerskov | |
| 7,579,950 B2 | 8/2009 | Lerch et al. | |
| 7,603,296 B2 | 10/2009 | Whiteley et al. | |
| 7,606,682 B2 | 10/2009 | Denny et al. | |
| D603,383 S | 11/2009 | Nyalamadugu et al. | |
| 7,619,523 B2 | 11/2009 | Durtschi et al. | |
| D607,442 S | 1/2010 | Su et al. | |
| 7,657,468 B1 | 2/2010 | Whiteley et al. | |
| 7,664,685 B1 | 2/2010 | Whiteley et al. | |
| 7,684,936 B2 | 3/2010 | Bechhoefer | |
| D620,483 S | 7/2010 | Conrad et al. | |
| 7,819,182 B2 | 10/2010 | Adamek | |
| 7,823,640 B2 | 11/2010 | Flanders | |
| 7,832,258 B2 | 11/2010 | Mudge et al. | |
| 7,849,619 B2 | 12/2010 | Mosher, Jr. et al. | |
| 7,893,832 B2 | 2/2011 | Laackmann | |
| 7,912,678 B2 | 3/2011 | Denny et al. | |
| 7,928,922 B2 | 4/2011 | King | |
| D651,591 S | 1/2012 | Hunter et al. | |
| D651,592 S | 1/2012 | Hunter et al. | |
| D651,593 S | 1/2012 | Hunter et al. | |
| 8,116,990 B2 | 2/2012 | Koul | |
| 8,120,497 B2 | 2/2012 | Binmore | |
| D655,081 S | 3/2012 | Maravilla et al. | |
| 8,289,173 B2 | 10/2012 | Ben-Mansour et al. | |
| 8,485,448 B2 | 7/2013 | Maizlin et al. | |
| D690,687 S | 10/2013 | Sun et al. | |
| D713,825 S | 9/2014 | Witkowski et al. | |
| 8,857,683 B2 | 10/2014 | Cameron et al. | |
| 8,985,156 B2 | 3/2015 | Drouin et al. | |
| D726,702 S | 4/2015 | Umlauf | |
| D731,171 S | 6/2015 | Upchurch et al. | |
| 2001/0047283 A1 | 11/2001 | Melick et al. | |
| 2002/0158120 A1 | 10/2002 | Zierolf | |
| 2003/0139982 A1 | 7/2003 | Schwartz et al. | |
| 2003/0192690 A1 | 10/2003 | Carlson et al. | |
| 2003/0209133 A1 | 11/2003 | Greenfield et al. | |
| 2004/0051368 A1 | 3/2004 | Caputo et al. | |
| 2004/0052202 A1 | 3/2004 | Brollier | |
| 2004/0074974 A1 | 4/2004 | Senba et al. | |
| 2004/0078306 A1 | 4/2004 | Whiteley et al. | |
| 2004/0088115 A1 | 5/2004 | Guggari et al. | |
| 2004/0107823 A1 | 6/2004 | Kiley et al. | |
| 2005/0087235 A1 | 4/2005 | Skorpik et al. | |
| 2006/0022056 A1 | 2/2006 | Sakama et al. | |
| 2006/0028344 A1 | 2/2006 | Forster | |
| 2006/0043199 A1 | 3/2006 | Baba et al. | |
| 2006/0076419 A1 | 4/2006 | Johnson | |
| 2007/0018825 A1 | 1/2007 | Morbitzer et al. | |
| 2007/0042820 A1 | 2/2007 | Cloonan | |
| 2007/0124220 A1 | 5/2007 | Griggs et al. | |
| 2007/0159336 A1 | 7/2007 | Tethrake et al. | |
| 2007/0171075 A1 | 7/2007 | Ryu | |
| 2007/0181726 A1 | 8/2007 | Ishikawa et al. | |
| 2007/0226487 A1 | 9/2007 | Li et al. | |
| 2008/0009149 A1 | 1/2008 | Arms et al. | |
| 2008/0009185 A1 | 1/2008 | Knoll et al. | |
| 2008/0029541 A1 | 2/2008 | Wallace et al. | |
| 2008/0252459 A1 | 10/2008 | Butler et al. | |
| 2009/0006153 A1 | 1/2009 | Greiner et al. | |
| 2009/0055293 A1 | 2/2009 | Mueller | |
| 2009/0058610 A1 | 3/2009 | Krebs et al. | |
| 2009/0112308 A1 | 4/2009 | Kassem | |
| 2009/0121895 A1 | 5/2009 | Denny et al. | |
| 2009/0188675 A1 | 7/2009 | Bloom et al. | |
| 2009/0205820 A1 | 8/2009 | Koederitz et al. | |
| 2009/0208295 A1 | 8/2009 | Kinert et al. | |
| 2009/0307763 A1 | 12/2009 | Rawlins et al. | |
| 2010/0051286 A1 | 3/2010 | McStay et al. | |
| 2010/0096455 A1 | 4/2010 | Binmore | |
| 2010/0123586 A1 | 5/2010 | Baba | |
| 2010/0326219 A1* | 12/2010 | Nelson .................. B65D 63/00 73/865.8 |

(56) References Cited

U.S. PATENT DOCUMENTS

| | | | |
|---|---|---|---|
| 2011/0052423 A1 | 3/2011 | Gambier et al. | |
| 2011/0060568 A1 | 3/2011 | Goldfine et al. | |
| 2011/0139877 A1 | 6/2011 | Szakelyhidi et al. | |
| 2011/0233283 A1 | 9/2011 | Hansen | |
| 2011/0240747 A1 | 10/2011 | Stewart et al. | |
| 2011/0253793 A1 | 10/2011 | King | |
| 2011/0270525 A1 | 11/2011 | Hunter | |
| 2011/0273296 A1 | 11/2011 | Laase et al. | |
| 2012/0061091 A1 | 3/2012 | Radi | |
| 2013/0209277 A1* | 8/2013 | Locke | F04B 53/00 417/53 |
| 2013/0317750 A1 | 11/2013 | Hunter | |
| 2016/0032707 A1* | 2/2016 | Bowman | G06K 7/10366 166/66 |
| 2017/0249543 A1 | 8/2017 | Smith et al. | |

FOREIGN PATENT DOCUMENTS

| | | |
|---|---|---|
| AU | 346764 | 2/2013 |
| AU | 346765 | 2/2013 |
| AU | 346766 | 2/2013 |
| AU | 2011245111 | 8/2015 |
| CA | 1333962 C | 1/1995 |
| CA | 2486126 A1 | 10/2005 |
| CA | 2515233 C | 10/2009 |
| CA | 2604118 C | 6/2010 |
| CA | 148446 | 8/2014 |
| CN | 1179196 A | 4/1998 |
| CN | 1862278 A | 11/2006 |
| CN | 101038639 A | 9/2007 |
| CN | 201035846 Y | 3/2008 |
| CN | 201142169 Y | 10/2008 |
| CN | 101320259 A | 12/2008 |
| CN | 101561676 A | 10/2009 |
| CN | 102003167 A | 4/2011 |
| CN | 1920901 B | 6/2011 |
| CN | 102312728 A | 1/2012 |
| CN | ZL201230542463 | 10/2013 |
| CN | 103793733 A | 5/2014 |
| DE | 102009043267 A1 | 4/2011 |
| EM | 002132621-0001 | 11/2012 |
| EM | 002132621-0002 | 11/2012 |
| EP | 0280489 A2 | 8/1988 |
| EP | 1895452 A1 | 3/2008 |
| FR | 2936039 A1 | 3/2010 |
| FR | 2955936 A1 | 8/2011 |
| GB | 2419671 A | 5/2006 |
| GB | 2475195 A | 5/2011 |
| JP | 11352243 | 12/1999 |
| JP | 2002352199 A | 12/2002 |
| JP | 2003035380 A | 2/2003 |
| JP | 2003139271 A | 5/2003 |
| JP | 2003185056 A | 7/2003 |
| JP | 2004213945 A | 7/2004 |
| JP | 2005181111 A | 7/2005 |
| JP | 2005335737 A | 12/2005 |
| JP | 2008033706 A | 2/2008 |
| JP | 2009083576 A | 4/2009 |
| JP | 2010152662 A | 7/2010 |
| JP | 4767148 B2 | 9/2011 |
| KR | 20050105674 A | 11/2005 |
| KR | 20060125151 A | 12/2006 |
| KR | 849955 B1 | 8/2008 |
| KR | 100919509 B1 | 9/2009 |
| KR | 20100012277 A | 2/2010 |
| KR | 20120065631 A | 6/2012 |
| NO | 083874 | 3/2013 |
| PK | 16438 | 5/2013 |
| SG | 146464 A1 | 10/2008 |
| SG | D2012/1277 F | 12/2012 |
| SG | D2012/1278 B | 12/2012 |
| TW | M305600 U | 2/2007 |
| TW | M305862 U | 2/2007 |
| WO | WO-2008012933 A1 | 1/2008 |
| WO | WO-2009089580 A1 | 7/2009 |
| WO | WO-2010018356 A2 | 2/2010 |
| WO | WO-2010086596 A1 | 8/2010 |
| WO | WO-2011137460 A2 | 11/2011 |
| WO | WO-2012094503 A2 | 7/2012 |
| WO | WO-2012119048 A2 | 9/2012 |
| WO | WO-2013177353 A2 | 11/2013 |

OTHER PUBLICATIONS

Australia Exam Report, dated Oct. 24, 2014, re App No. 2011245111.

Australian Exam Report, dated Jul. 26, 2013, by IP Australia, re App No. 2011245111.

Azerbaijan office action dated Sep. 17, 2013, re App No. S20120046.

Canadian Exam Report, by the CIPO, dated May 2, 2014, re App No. 2797081.

Canadian Exam Report dated Jan. 13, 2014, by the CIPO, re App No. 148446.

Canadian Exam Report, dated Aug. 20, 2013, by the CIPO, re App No. 148446.

Canadian Office Action dated Jun. 4, 2015, by the CIPO, re App No. 2797081.

Chinese Office Action, dated Apr. 9, 2015, re App No. 201180032488.0.

Chinese Office Action, dated Aug. 8, 2014, re App No. 201180032488.0.

E&P, New Wireless Solution Improves Visibility, Value, Safety, Terence Leung, 2010, p. 20.

Eurasia Office Action, dated Apr. 13, 2015, re App No. 2012291142.

Final Office Action, dated Apr. 24, 2015, by the USPTO, re U.S. Appl. No. 13/099,307.

International Preliminary Report on Patentability, by the IPEA/US, dated Jul. 16, 2014, re PCT/US2013/042345.

International Search Report and Written Opinion, dated Nov. 23, 2011, re PCT/US2011/034863.

International Search Report and Written Opinion dated Dec. 2, 2013, by the ISA/US, re PCT/US2013/042345.

Kurita T., et al., Network Wireless Sensor for Remote Monitoring of Gas Wells, Fuji Electric Review Journal, 2006, vol. 53 (1), pp. 17-20.

Mexico Office Action, dated Oct. 31, 2014, re App No. MX/a/2012/012444.

Mexico Office Action, dated Sep. 19, 2013, re App No. MX/a/2012/012444.

Supplemental European Search Report, dated Apr. 8, 2015, re EP App No. 11775718.7.

Mexico Office Action, re App No. MX/a/2012/012444.

Notice of Allowance dated Apr. 12, 2006, by the USPTO, re U.S. Appl. No. 10/755,456.

Notice of Allowance, dated May 16, 2014, by the USPTO, re U.S. Appl. No. 29/420,448.

Notice of Allowance dated Oct. 19, 2015, by the USPTO, re U.S. Appl. No. 29/503,568.

Notice of Allowance dated Oct. 7, 2011, by the USPTO, re U.S. Appl. No. 29/393,452.

Notice of Allowance dated Oct. 7, 2011, by the USPTO, re U.S. Appl. No. 29/393,453.

Notice of Allowance dated Oct. 7, 2011, by the USPTO, re U.S. Appl. No. 29/393,454.

Office Action dated Aug. 30, 2005, by the USPTO, re U.S. Appl. No. 10/755,456.

Office Action dated Feb. 21, 2006, by the USPTO, re U.S. Appl. No. 10/755,456.

Office Action dated Oct. 7, 2005, by the USPTO, re U.S. Appl. No. 10/755,456.

Office Action dated Sep. 17, 2013, by the USPTO, re U.S. Appl. No. 13/099,307.

Office Action dated Sep. 30, 2014, by the USPTO, re U.S. Appl. No. 13/099,307.

Pakistan office action re App No. 16438-D, dated Aug. 11, 2012.

PC-102-Dome specification sheet, Available at http://troirfid.com and yahoo.sub.site.sub.admin/assets/docs/PC-102.sub/Dome.277173131.xls, last visited Jul. 12, 2011.

(56) References Cited

OTHER PUBLICATIONS

Petersen S., et al., A Survey of Wireless Technology for the Oil and Gas Industry, Society of Petroleum Engineers, 2008 SPE Intelligent Energy Conference and Exhibition, Feb. 25-27, 2008, Amsterdam, The Netherlands.
Russian Office Action dated Oct. 21, 2013, re App No. 2012503905.
Schempf, Hagen, Ph.D., GasNet: Gas Main Sensor and Communications Network System, Phase 1 Topical Report, Document No. REP-GOV, DOE-020303, Work Performed by Automatika, Inc., Pittsburgh, PA15238, Feb. 27, 2003.
TROI—Home, http://www.troirfid.com, last visited Jul. 12, 2011.
Office Action dated May 18, 2017, by the USPTO, re U.S. Appl. No. 14/812,751.

\* cited by examiner

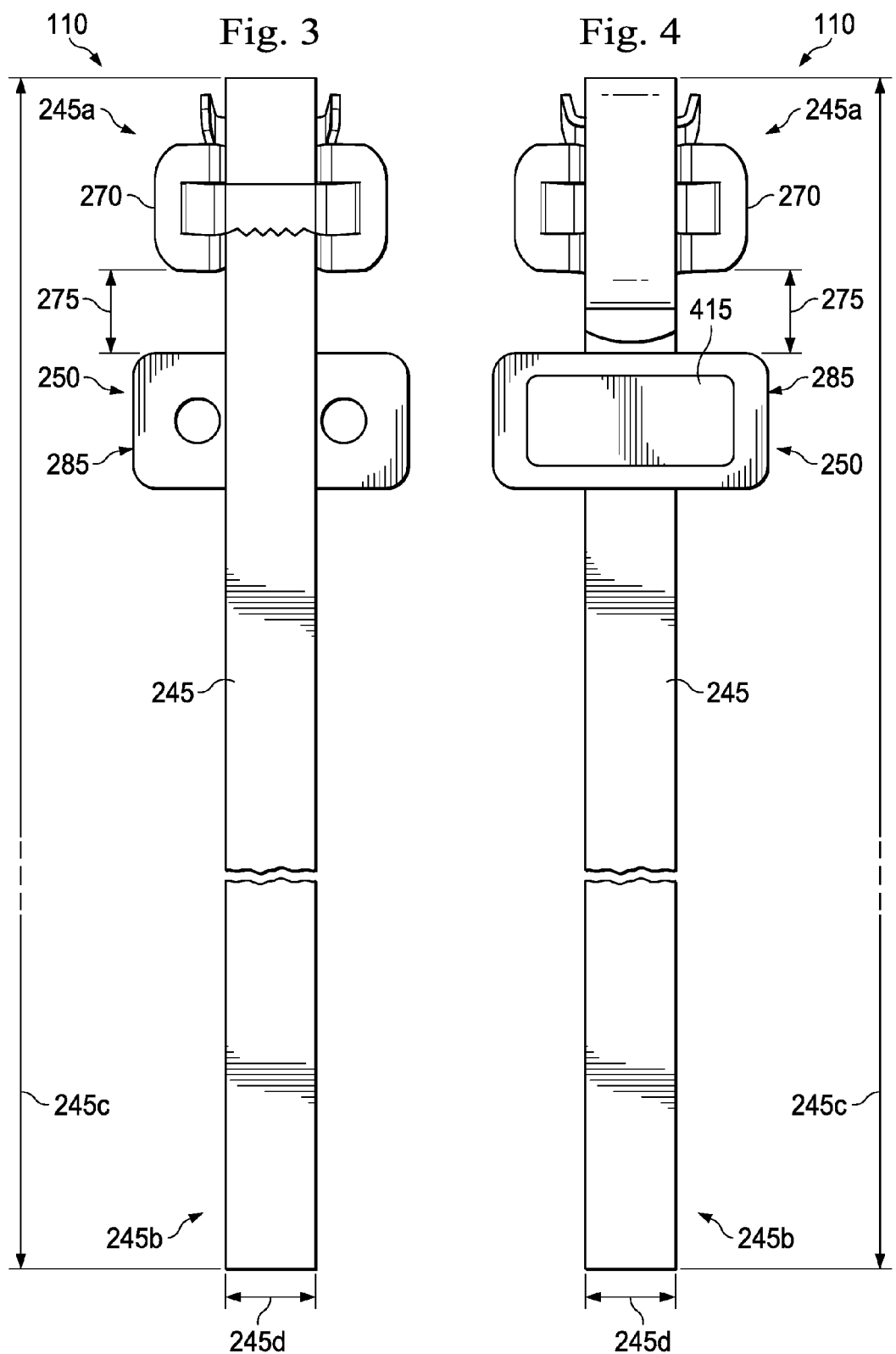

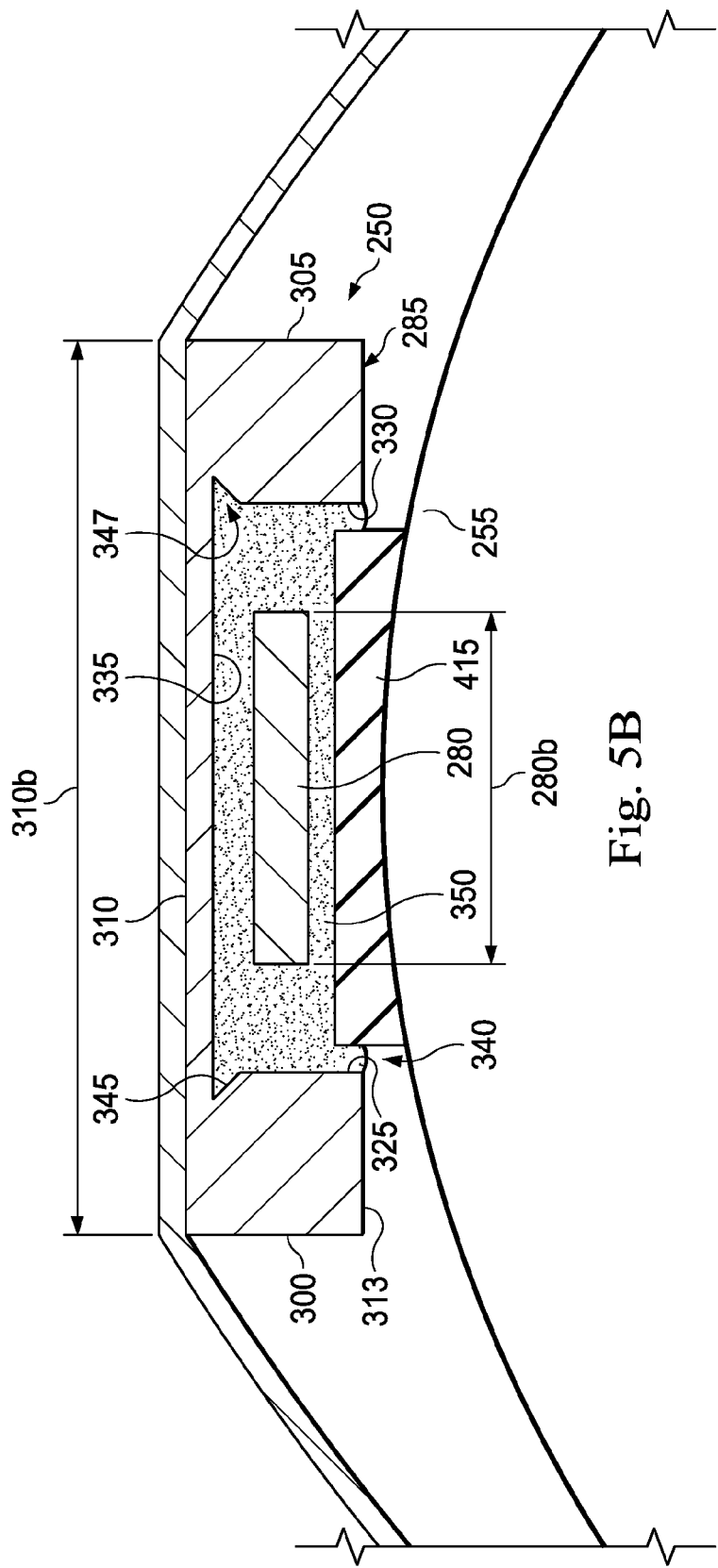

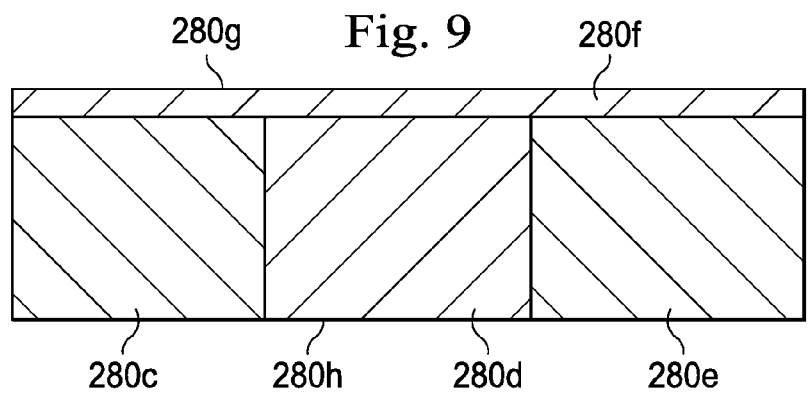
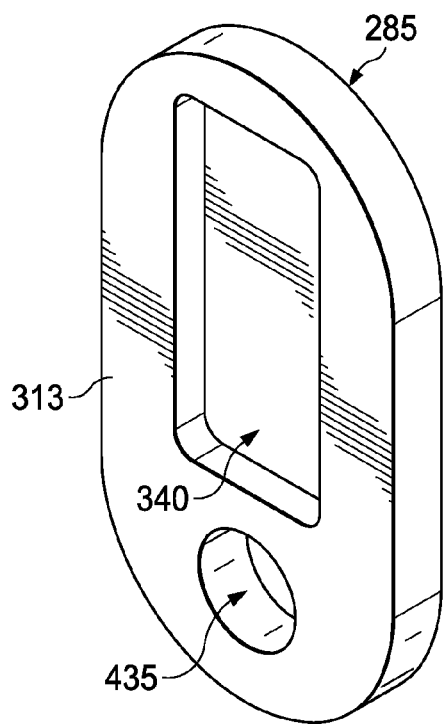
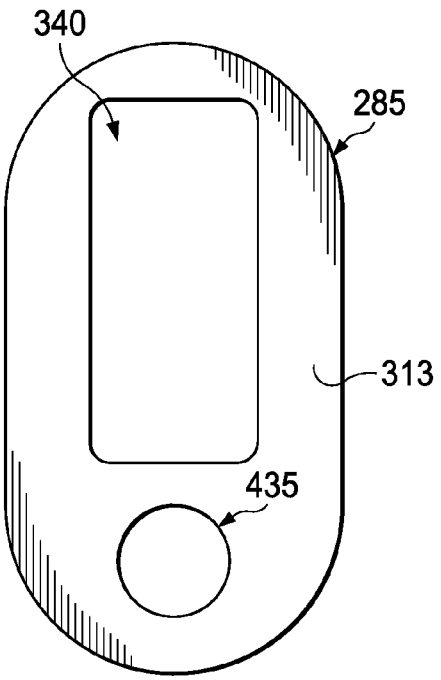

CARRIER AND BAND ASSEMBLY FOR IDENTIFYING AND MANAGING A COMPONENT OF A SYSTEM ASSOCIATED WITH A WELLHEAD

CROSS-REFERENCE TO RELATED APPLICATION

This application claims the benefit of the filing date of, and priority to, U.S. Application No. 62/205,223, filed Aug. 14, 2015, the entire disclosure of which is hereby incorporated herein by reference.

TECHNICAL FIELD

This disclosure relates in general to a system associated with a wellhead and, in particular, to an apparatus and methods for identifying and managing a component of a system for pumping fluid to a wellhead.

BACKGROUND OF THE DISCLOSURE

Several systems are used to facilitate oil and gas exploration and production operations. One example is a hydraulic fracturing (or "frac") system, which pumps fluid to a wellhead for the purpose of propagating fractures in a formation through which a wellbore extends, the wellhead being the surface termination of the wellbore. In many cases, different components of different hydraulic fracturing systems need to be identified and tracked in order to, for example, improve safety by replacing system components before they unexpectedly fail, reduce system downtime and cost by eliminating unexpected component failures and/or component performance degradations, and facilitate planning of future systems by identifying suitable existing components for the future systems. Therefore, what is needed is an apparatus or method that addresses one or more of the foregoing issues.

SUMMARY

In a first aspect, there is provided an apparatus adapted to be connected to a component that is part of a pump system or a manifold trailer, the apparatus including a block that defines a first exterior surface and an opposing second exterior surface and that includes a recess that is formed in the first exterior surface and that extends towards the second exterior surface; and an opening that is formed in the second exterior surface; and an electronic identifying device at least partially accommodated within the recess, the electronic identifying device including a first portion having data stored thereon that provides identification of the component to which the apparatus is adapted to be connected.

In an exemplary embodiment, the electronic identifying device further includes a second portion having data stored thereon that provides one of: information associated with certification of the component; and identification of the pump system or the manifold trailer of which the component is a part.

In another exemplary embodiment, the electronic identifying device further includes a third portion having data stored thereon that provides the other one of: the information associated with certification of the component; and the identification of the pump system or the manifold trailer of which the component is a part.

In yet another exemplary embodiment, the electronic identifying device includes an RFID chip; the second portion is adapted to store data that is written by a first party and that is read by the first party; and the third portion is adapted to store data that is written by a second party and that is read by the second party.

In certain exemplary embodiments, the second portion is adapted so that the data stored in the second portion is capable of being read by the second party but cannot be written by the second party; and wherein the third portion is adapted so that the data stored in the third portion is capable of being read by the first party but cannot be written by the first party.

In an exemplary embodiment, the opening that is formed in the second exterior surface extends towards the recess.

In another exemplary embodiment, the opening is a through-hole that extends from the second exterior surface to the recess and that defines a longitudinal axis; the electronic identifying device further includes an antenna that is operably coupled to each of the first and second portions; and the electronic identifying device is accommodated within the recess so that the longitudinal axis of the opening intersects with the antenna to facilitate detection of the electronic identifying device and thus identification of the component.

In yet another exemplary embodiment, the apparatus further includes a pad extending beyond the first exterior surface and contacting the component to provide insulation against vibration of the electronic identifying device upon vibration of the component; wherein the pad prevents the block and/or the electronic identifying device from contacting the component to reduce or prevent damage to the block and/or the electronic identifying device from vibration of the component.

In a second aspect, there is provided an apparatus including a tubular member through which a fluid is adapted to flow; a band having a band length and extending circumferentially around the tubular member; a carrier including a block that defines a first exterior surface and an opposing second exterior surface, the block having a length; wherein the block includes a recess that is formed in the first exterior surface and that extends towards the second exterior surface; and an opening that is formed in the second exterior surface; wherein the carrier is attached to the band so that the length of the block is perpendicular to the band length; and an electronic identifying device that is fixedly attached to the block and that is at least partially accommodated within the recess of the block.

In an exemplary embodiment, electronic identifying device is disposed between the band and the tubular member.

In another exemplary embodiment, the carrier further includes a pad disposed between the outer surface of the tubular member and the electronic identifying device.

In yet another exemplary embodiment, the pad is anti-vibration insulation.

In certain exemplary embodiments, the second exterior surface of the block is fixedly attached to the band via at least one of an adhesive, a fastener, and a spot weld.

In an exemplary embodiment, the second exterior surface of the block is slidably attached to the band via a cover that defines a first exterior surface and an opposing second exterior surface, the cover being fixedly attached to the block; the cover includes a channel formed in the first exterior surface and that extends towards the second exterior surface; and the band is maintained within the channel, between the first exterior surface of the cover and the second exterior surface of the block.

In another exemplary embodiment, the opening that is formed in the second exterior surface extends towards the recess.

In yet another exemplary embodiment, the electronic identifying device includes an RFID chip that has an antenna; the opening is a through-hole that extends from the second exterior surface to the recess and that defines a longitudinal axis; and the RFID chip is accommodated within the recess so that longitudinal axis of the opening intersects the antenna to facilitate detection of the RFID chip.

In certain exemplary embodiments, the carrier further includes a material disposed in the recess to facilitate the fixed attachment of the electronic identifying device to the block.

In an exemplary embodiment, the block further includes a first and a second interior surface that are spaced in parallel relation and that are defined by the recess; and an interior shoulder formed within at least one of the first and second interior surfaces; and wherein the electronic identifying device is spaced from each of the first and second interior surfaces.

In a third aspect, there is provided an apparatus including a carrier including a block that defines a first exterior surface and an opposing second exterior surface, the block including a recess that is formed in the first exterior surface and that extends towards the second exterior surface; and an opening that is formed in the second exterior surface and that extends towards the recess, the opening defining a longitudinal axis; and an electronic identifying device fixedly attached to the block and at least partially accommodated within the recess so that the longitudinal axis of the opening intersects the electronic identifying device.

In an exemplary embodiment, the carrier further includes a material disposed in the recess to facilitate the fixed attachment of the electronic identifying device to the block.

In another exemplary embodiment, the block further includes a first and a second interior surface that are spaced in parallel relation and that are defined by the recess; and an interior shoulder formed within at least one of the first and second interior surfaces.

In yet another exemplary embodiment, the block further includes a channel defined by the interior shoulder; and the carrier further includes a hardened material disposed about the electronic identifying device and within the channel to structurally secure the hardened material and the electronic identifying device to the block.

In certain exemplary embodiments, the carrier further includes a pad connected to the electronic identifying device.

In an exemplary embodiment, the pad is an anti-vibration insulation.

In another exemplary embodiment, the opening is a through-hole that extends from the second exterior surface to the recess; the electronic identifying device includes an antenna; and the electronic identifying device is accommodated within the recess so that the longitudinal axis of the opening intersects the antenna to facilitate detection of the electronic identifying device.

In a fourth aspect, there is provided a method for securing an electronic identifying device to a component that is part of a pump system or a manifold trailer, the method including attaching a carrier to a band, the carrier including a block that defines a first exterior surface and an opposing second exterior surface; wherein the block includes a recess that is formed in the first exterior surface and that extends towards the second exterior surface; and an opening that is formed in the second exterior surface; and attaching the electronic identifying device fixedly to the block so that the electronic identifying device is at least partially accommodated within the recess of the block; and securing the band circumferentially around the component so that relative movement between the band and the component is prevented or reduced; wherein, when the band is secured circumferentially around the component, the electronic identifying device is disposed between the band and the component.

In an exemplary embodiment, attaching the carrier to the band includes fixedly attaching the second exterior surface of the block to the band via at least one of an adhesive, a fastener, and a spot weld.

In another exemplary embodiment, attaching the carrier to the band includes slidably attaching the second exterior surface of the block to the band via a cover that defines a first exterior surface and an opposing second exterior surface, the cover being fixedly attached to the block; wherein the cover includes a channel formed in the first exterior surface and that extends towards the second exterior surface; and wherein, when the second exterior surface of the block is slidably attached to the band via the cover, the band is maintained within the channel, between the first exterior surface of the cover and the second exterior surface of the block.

In yet another exemplary embodiment, the opening that is formed in the second exterior surface extends towards the recess.

In certain exemplary embodiments, the electronic identifying device includes an antenna; the opening is a through-hole that extends from the second exterior surface to the recess and that defines a longitudinal axis; and attaching the electronic identifying device fixedly to the block includes accommodating the electronic identifying device within the recess so that the longitudinal axis of the opening intersects the antenna to facilitate detection of the electronic identifying device.

In an exemplary embodiment, attaching the electronic identifying device fixedly to the block includes placing a material in the recess to facilitate the fixed attachment of the electronic identifying device to the block; and adhering the electronic identifying device to the material disposed within the recess.

In another exemplary embodiment, attaching the electronic identifying device fixedly to the block further includes adhering a pad to the electronic identifying device with the material, the pad including an anti-vibration insulation; wherein, when the band is secured circumferentially around the component, the pad is disposed between the electronic identifying device and the outer surface of the component.

In yet another exemplary embodiment, the block further includes a first and a second interior surface that are spaced in parallel relation and that are defined by the recess; and an interior shoulder formed within at least one of the first and second interior surfaces; and wherein, when the electronic identifying device is fixedly attached to the block, the electronic identifying device is spaced from each of the first and second interior surfaces.

DESCRIPTION OF FIGURES

The accompanying drawings facilitate an understanding of the various embodiments.

FIG. 3 is a top view of the identifier of FIG. 2, but with the tubular member omitted, according to an exemplary embodiment.

FIG. 4 is a bottom view of the identifier of FIG. 3, according to an exemplary embodiment.

FIG. 5B is another sectional view of a portion of the identifier of FIG. 5A, according to an exemplary embodiment.

FIG. 9 is a sectional view of the electronic identifying device of FIG. 5A, according to an exemplary embodiment.

FIG. 10 is a perspective view of another embodiment of the identifier of FIG. 2, according to an exemplary embodiment.

FIG. 11 is a top view of the identifier of FIG. 10, according to an exemplary embodiment.

DETAILED DESCRIPTION

Figure 1A:
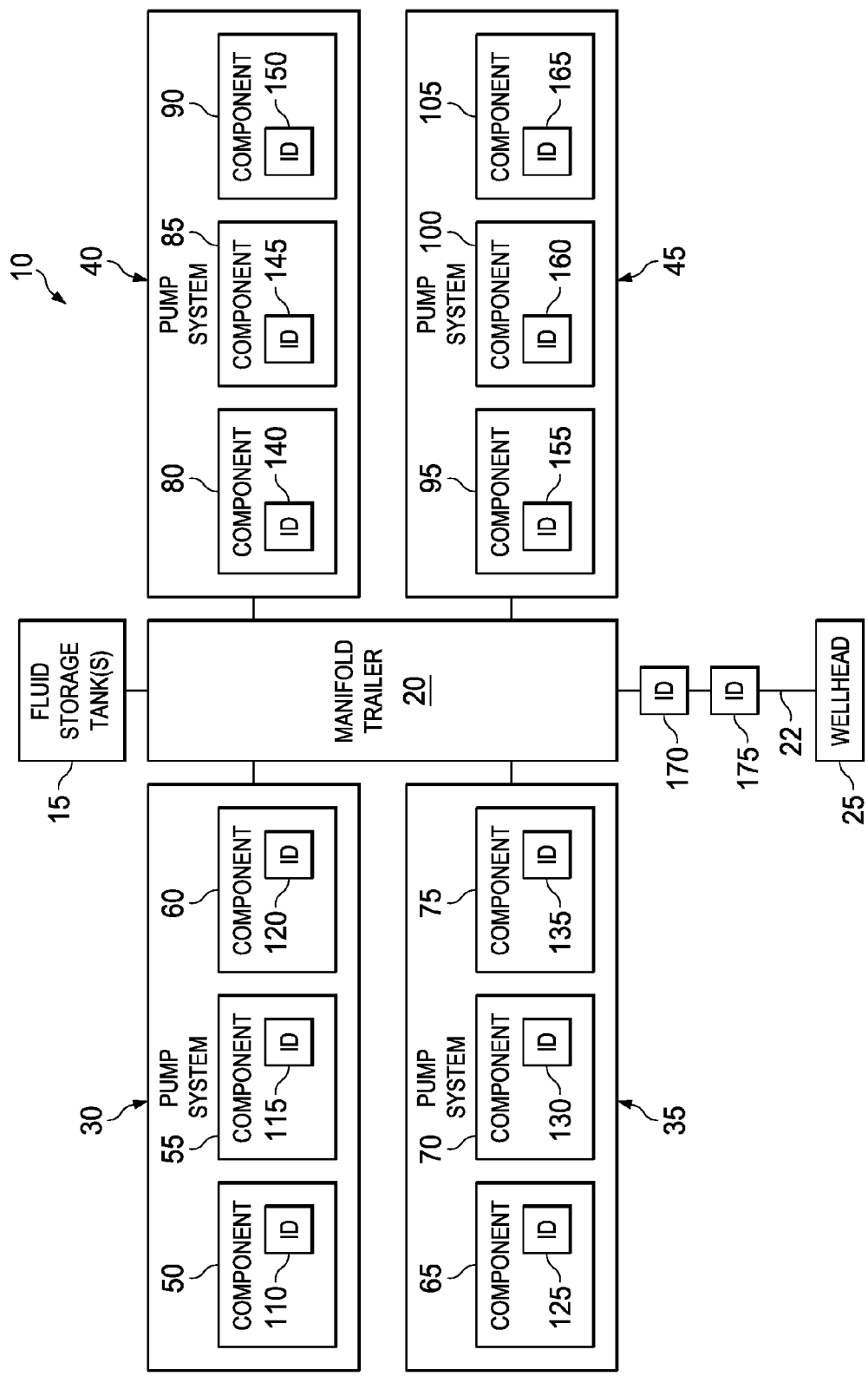
FIGS. 1A and 1B are diagrammatic illustrations of a system for pumping fluid to a wellhead according to an exemplary embodiment, the system including identifiers.
Figure 1B:
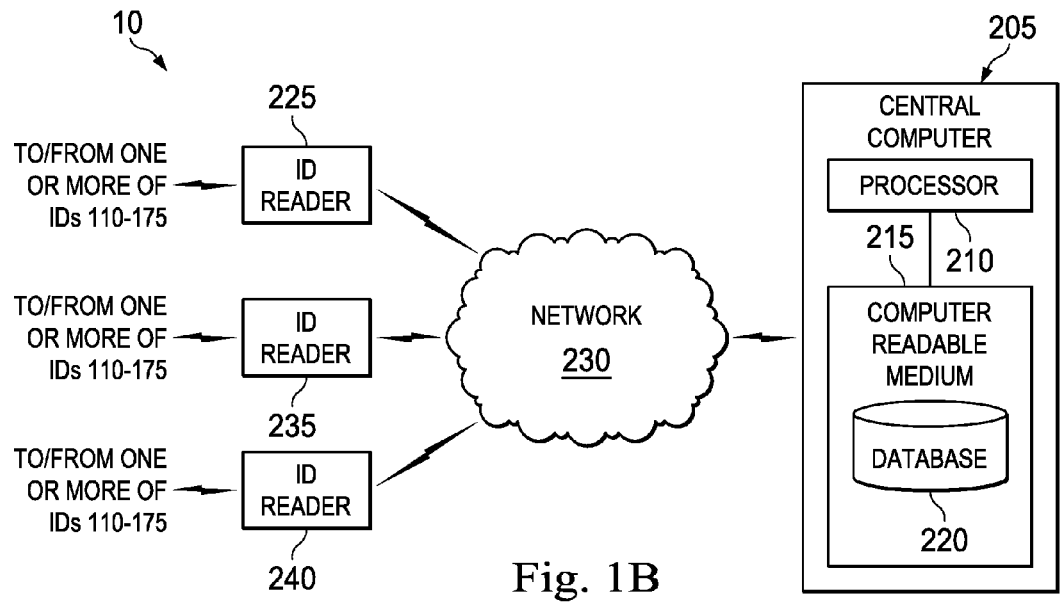

In an exemplary embodiment, as illustrated in FIGS. 1A and 1B, a system is generally referred to by the reference numeral 10 and includes one or more fluid storage tanks 15 for a fracturing system. The exemplary embodiments provided herein are not limited to a fracturing system as the embodiments may be used or adapted to a mud pump system, well treatment system, or other pump system.

In an exemplary embodiment, a manifold trailer 20 is in fluid communication with the fluid storage tanks 15. A wellhead 25 is in fluid communication with the manifold trailer 20 via one or more fluid lines 22. The wellhead 25 is the surface termination of a wellbore (not shown). Pump apparatuses or systems 30, 35, 40, and 45 are in fluid communication with the manifold trailer 20. The pump system 30 includes apparatuses or components 50, 55, and 60. The pump system 35 includes components 65, 70, and 75. The pump system 40 includes components 80, 85, and 90. The pump system 45 includes components 95, 100, and 105.

In an exemplary embodiment, the system 10 is adapted to pump fluid to the wellhead 25. More particularly, one or more of the pump systems 30, 35, 40, and 45 pump fluid from the fluid storage tanks 15 to the wellhead 25 via at least the manifold trailer 20 and the fluid lines 22. In an exemplary embodiment, the system 10 is, includes, or is part of, a hydraulic fracturing (or "frac") system. In an exemplary embodiment, the fluid storage tanks 15 are frac tanks. In an exemplary embodiment, each of the pump systems 30, 35, 40, and 45 is, includes, or is part of, a frac truck, a frac or well service pump, and/or any combination thereof. In an exemplary embodiment, each of the components 50, 55, 60, 65, 70, 75, 80, 85, 90, 95, 100, and 105 is a tubular member, which may be, or may be a part of, a section of pipe, a fitting, a valve, a frac or well service pump component, a fluid line, a manifold, a fluid connection, and/or any combination thereof. In an exemplary embodiment, each of the components 50, 55, 60, 65, 70, 75, 80, 85, 90, 95, 100, and 105 is a section of pipe, a fitting, a valve, a ball injector, a bridal assembly, a cement head, a choke tee, a frac head, a hammer union, an integral union connection, a steel hose loop, a swivel joint, a flow line safety restraint system, clamps, a frac or well service pump component, a fluid line, a manifold, a fluid connection, and/or any combination thereof.

As shown in FIGS. 1A and 1B, identifiers 110, 115, and 120 are coupled to the components 50, 55, and 60, respectively, of the pump system 30. Identifiers 125, 130, and 135 are coupled to the components 65, 70, and 75, respectively, of the pump system 35. Identifiers 140, 145, and 150 are coupled to the components 80, 85, and 90, respectively, of the pump system 40. Identifiers 155, 160, and 165 are coupled to the components 95, 100, and 105, respectively, of the pump system 45. Identifiers 170 and 175 are coupled to the fluid lines 22. The identifiers 110-175 are read or scanned by an identification (ID) interrogator or reader 225, 235, and/or 240.

As shown in FIG. 1B, the system 10 further includes a computer 205, which includes a processor 210 and a computer readable medium 215 operably coupled thereto. Instructions accessible to, and executable by, the processor 210 are stored in the computer readable medium 215. A database 220 is also stored in the computer readable medium 215. The ID reader 225 is operably coupled to, and in communication with, the computer 205 via a network 230. Likewise, ID readers 235 and 240 are each operably coupled to, and in communication with, the computer 205 via the network 230. Each of the ID readers 225, 235, and 240 is adapted to transmit signals to, and receive signals from, one or more of the identifiers 110-175.

In an exemplary embodiment, each of the identifiers 110-175 is a radio frequency identification (RFID) tag, and each of the ID readers 225, 235, and 240 is an RFID reader. In an exemplary embodiment, each of the ID readers 225, 235, and 240 is an MC9090-G Handheld RFID Reader, which is available from Motorola Solutions, Inc., Schaumburg, Ill.

In several exemplary embodiments, the computer 205 is a workstation, personal computer, server, portable computer, smartphone, personal digital assistant (PDA), cell phone, another type of computing device, and/or any combination thereof. In an exemplary embodiment, the computer 205 is part of one or more of the ID readers 225, 235, and 240. In an exemplary embodiment, the network 230 includes the Internet, one or more local area networks, one or more wide area networks, one or more cellular networks, one or more wireless networks, one or more voice networks, one or more data networks, one or more communication systems, and/or any combination thereof. In several exemplary embodiments, one or more of the components of the system 10 and/or content stored therein, and/or any combination thereof, are parts of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
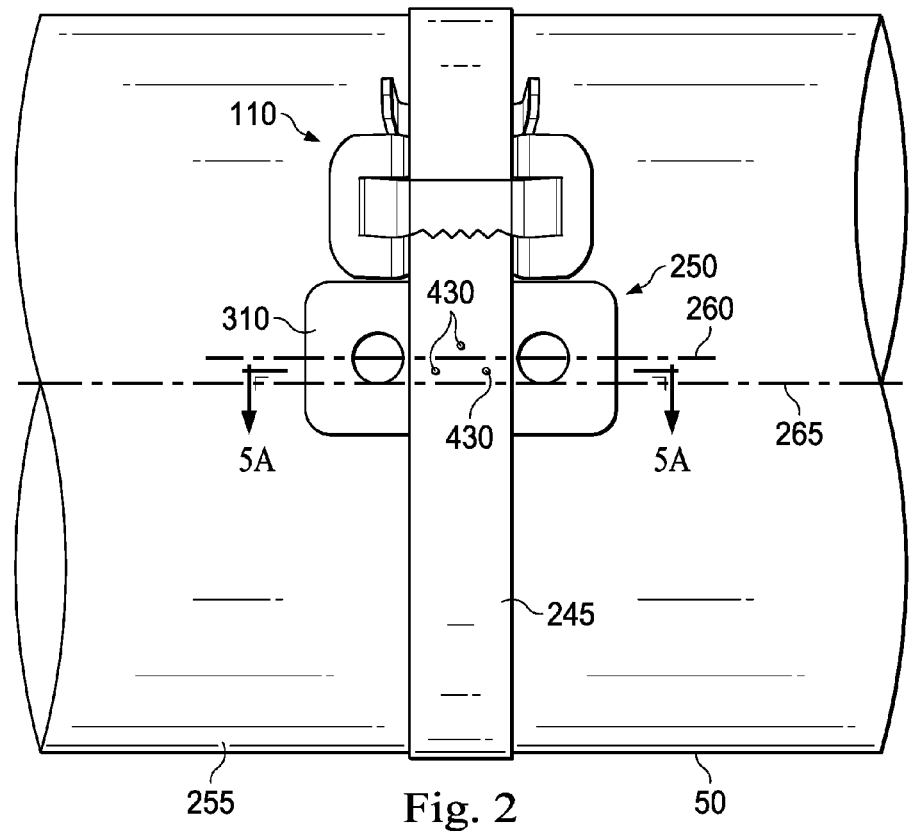
FIG. 2 is a top view of one of the identifiers illustrated in FIG. 1A engaging a tubular member, according to an exemplary embodiment.
Figure 5A:
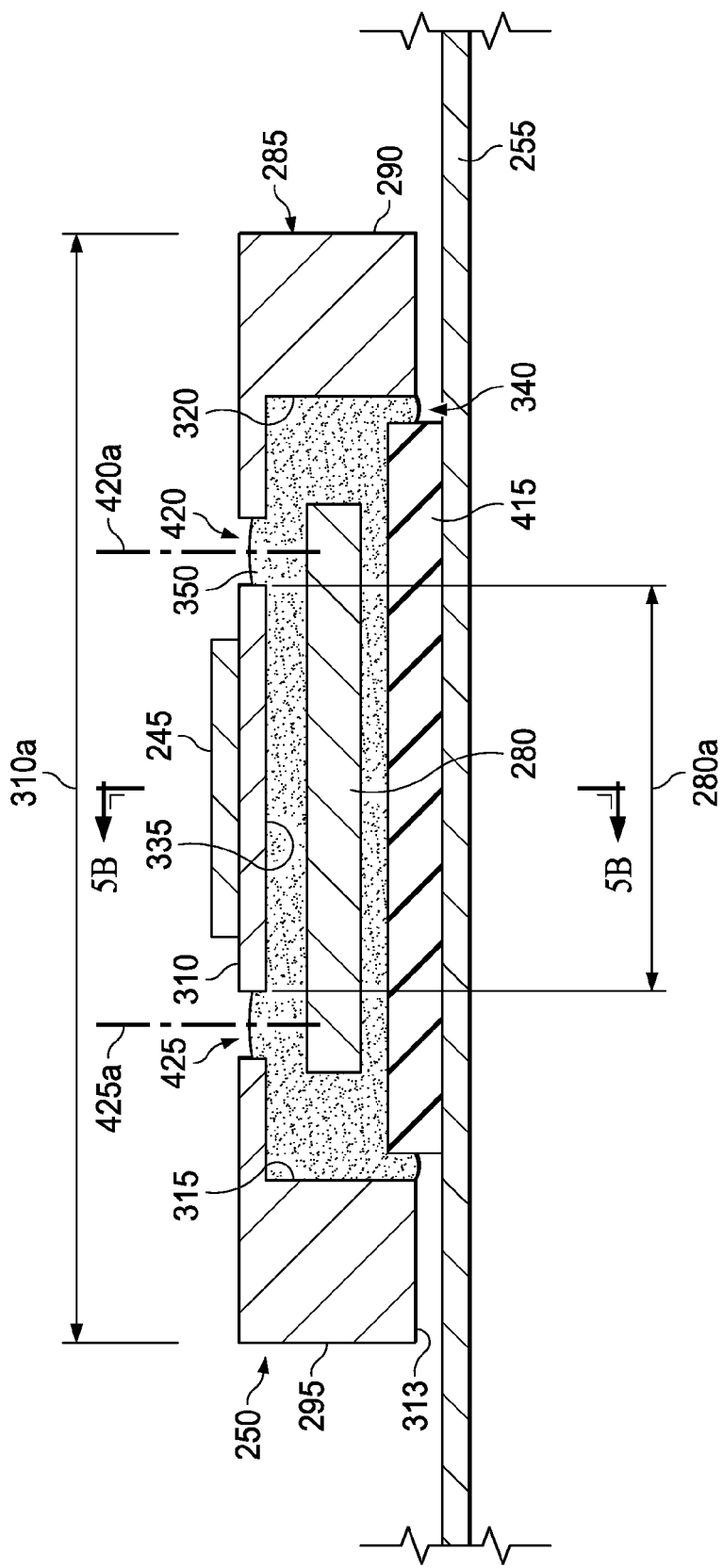
FIG. 5A is a sectional view of a portion of the identifier of FIG. 2, the identifier including an electronic identifying device, according to an exemplary embodiment.
Figure 6:
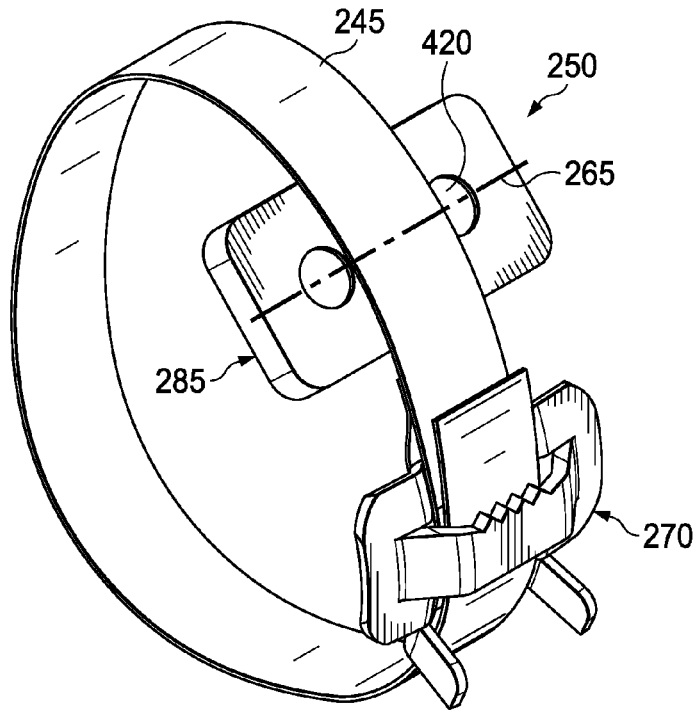
FIGS. 6 and 7 are perspective views of the identifier of FIG. 3, according to an exemplary embodiment.
Figure 7:
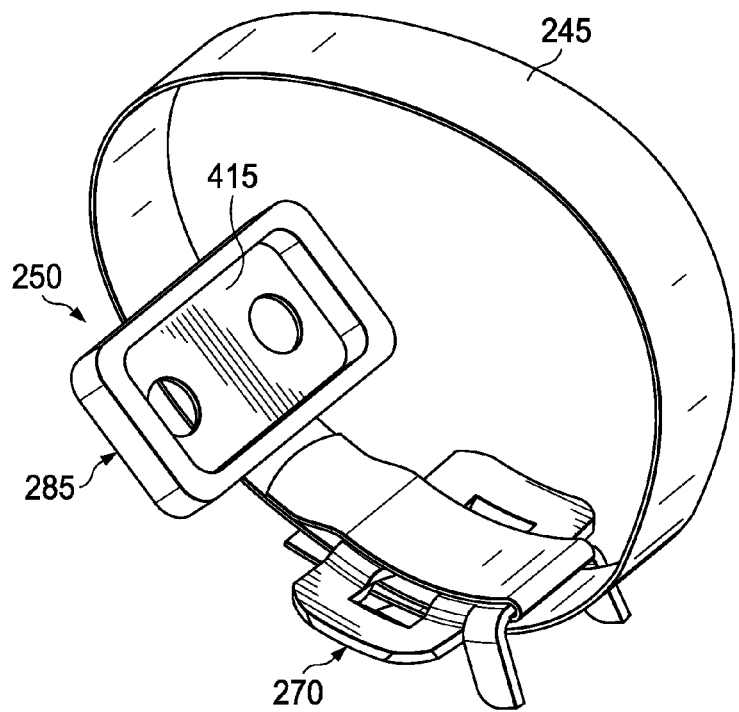

In an exemplary embodiment, as illustrated in FIG. 2 with continuing reference to FIGS. 1A and 1B, the identifier 110 includes a band 245 and a carrier 250 fixedly attached thereto. As shown in FIG. 2, the component 50 is a tubular member 255 such as, for example, a section of pipe. The band 245 extends circumferentially around the tubular member 255. The carrier 250 defines a longitudinal axis 260 that is in a parallel relation to a longitudinal axis 265 of the tubular member 255. In one or more exemplary embodiments, the placement of the carrier 250 such that the longitudinal axis 260 is in parallel relation to the longitudinal axis 265 of the tubular member 255 reduces the stresses on the carrier 250 when the band 245 is secured around the tubular member 255.

In an exemplary embodiment, as illustrated in FIGS. 3 and 4 with continuing reference to FIGS. 1A, 1B, and 2, the band 245 includes opposing end portions 245a and 245b, which may be coupled together via a buckle 270. The opposing end portions 245a and 245b may be coupled together so that relative movement between the band 245 and the tubular member 255 (shown in FIG. 2) is prevented. The carrier 250 is attached to the band 245 so that a spacing 275 is defined along the band 245 and between the carrier 250 and the buckle 270. In one or more exemplary embodiments, the band 245 defines a band length 245c and a band width 245d that is less than the band length 245c.

In an exemplary embodiment, the carrier 250 is fixedly attached to the band 245 so that the spacing 275 is fixed. In an exemplary embodiment, the fixed spacing 275 ranges from greater than 0 inches to about 36 inches. In an exemplary embodiment, the fixed spacing 275 ranges from greater than 0 inches to about 10 inches. In an exemplary embodiment, the fixed spacing 275 ranges from about 1 inch to about 9 inches. In an exemplary embodiment, the fixed spacing 275 ranges from about 2 inches to about 8 inches. In an exemplary embodiment, the fixed spacing 275 ranges from about 3 inches to about 7 inches. In an exemplary embodiment, the fixed spacing 275 ranges from about 4 inches to about 6 inches. In an exemplary embodiment, the fixed spacing 275 ranges from about 5.5 inches to about 6.5 inches. In an exemplary embodiment, the fixed spacing 275 is less than 2 inches. In an exemplary embodiment, the fixed spacing 275 is about 6 inches.

In an exemplary embodiment, the carrier 250 is slidably attached to the band 245 so that the spacing 275 is variable. In an exemplary embodiment, the variable spacing 275 ranges from greater than 0 inches to about 36 inches. In an exemplary embodiment, the variable spacing 275 ranges from greater than 0 inches to about 10 inches. In an exemplary embodiment, the variable spacing 275 ranges from about 1 inch to about 9 inches. In an exemplary embodiment, the variable spacing 275 ranges from about 2 inches to about 8 inches. In an exemplary embodiment, the variable spacing 275 ranges from about 3 inches to about 7 inches. In an exemplary embodiment, the variable spacing 275 ranges from about 4 inches to about 6 inches. In an exemplary embodiment, the variable spacing 275 ranges from about 5.5 inches to about 6.5 inches. In an exemplary embodiment, the variable spacing 275 is less than 2 inches. In an exemplary embodiment, the variable spacing 275 is about 6 inches.

In an exemplary embodiment, as illustrated in FIGS. 5A, 5B, 6, and 7 with continuing reference to FIGS. 1A, 1B, 2, 3, and 4, an electronic identifying device 280 is at least partially enclosed in the carrier 250. Generally, the carrier 250 includes a block 285 to which the electronic identifying device 280 is fixedly attached. The block 285 includes opposing sides 290 and 295 spaced in a parallel relation, opposing sides 300 and 305 spaced in a parallel relation and extending between the sides 290 and 295, and opposing sides 310 and 313 spaced in a parallel relation and extending between the sides 290, 295, 300, and 305. In an exemplary embodiment, the side 310 is a first exterior surface of the carrier 250 defining a length 310a and a width 310b that is less than the length 310a. In an exemplary embodiment, the length 310a is parallel to the longitudinal axis 265 of the tubular member 255 and perpendicular to the band length 245c. However, the length 310a may be positioned relative to the band length 245c in a variety of ways, such as parallel to the band length 245c or anywhere between parallel and perpendicular to the band length 245c. In an exemplary embodiment, the side 313 is a second exterior surface of the carrier 250. The placement of the carrier 250 such that the longitudinal axis 260 of the carrier 250 is in parallel relation to the longitudinal axis 265 of the tubular member 255 may reduce the stress and strain acting upon the carrier 250. The block 285 also includes interior surfaces 315 and 320 spaced in a parallel relation, interior surfaces 325 and 330 spaced in a parallel relation and extending between the interior surfaces 315 and 320, and an interior surface 335 extending between the surfaces 315, 320, 325, and 330. The spacing of surfaces in a parallel relation includes spacing of surfaces in a generally parallel relation (within 20 degrees). A recess 340 is formed into the second exterior surface of the carrier 250, which is defined by the side 313, and extends toward the first exterior surface of the carrier 250, which is defined by the side 310. Thus, the interior surfaces 315, 320, 325, 330, and 335, define the recess 340. In an exemplary embodiment, at least one of the interior surfaces 315, 320, 325, and 330 forms an interior ledge or shoulder 345 in the block 285. In an exemplary embodiment, a channel 347 is defined at least in part by the interior shoulder 345 and the interior surface 335. For example, and when the interior surface 325 forms the interior shoulder 345, the interior shoulder 345 slopes towards the side 300 to form the channel 347. The electronic identifying device 280 is at least partially disposed in the recess 340. In one or more exemplary embodiments, the device 280 is positioned within the recess 340 such that the device 280 is spaced from each of the interior surfaces 315, 320, 325, 330, and 335. A material 350 is also disposed in the recess 340 and facilitates the fixed attachment of the electronic identifying device 280 to the block 285. The material 350 may be an elastomeric material, an epoxy, a potting compound or material, and/or any combination thereof. In an exemplary embodiment, the material 350 is a hardenable adhesive, such as, for example, Loctite M-31CL, which is available from Henkel AG & Co., Dusseldorf, Germany. However, the material 350 may also be 3M Scotch-Weld Epoxy Adhesive, which is available from 3M, St. Paul, Minn. The device 280 is surrounded or partially surrounded by the material 350. That is, the material 350 coats the device 280 such that the device 280 is spaced from the interior surfaces 315, 320, 325, 330, and 335 of the block 285. In one or more exemplary embodiments, the device 280 is spaced from the interior surface 335 by about 0.02 inches of the material 350. However, the device 280 may be spaced from the interior surface 335 by any distance between 0.005 inches to 0.1 inches. The read range of the device 280 may be altered if the device 280 contacts any one of the interior surfaces 315, 320, 325, 330, and 335 of the block 285. Thus, the material 350 prevents the device 280 from contacting any one of the interior surfaces 315, 320, 325, 330, and 335 of the block 285 and also may waterproof the device 280. In one or more exemplary embodiments, the material 350 hardens within the recess 340 and within the channel 347 to structurally attach the hardened material 350 and the device 280 within the recess 340. That is, structurally, and due to the interior shoulder 345, the shape of the hardened material 350 that is disposed within the channel 347 prevents the hardened material 350 and the device 280 from falling out of the recess 340. Thus, even if the material 350 is uncoupled (i.e., loses adherence) from the interior surfaces 315, 320, 325, 330, and 335, the hardened material 350 and the device 280 are held within the enclosure by the interior shoulder 345. The device 280 defines a length 280a and a width 280b that is less than the length 280a. In an exemplary embodiment, the device 280 is accommodated within the recess 340 so that the length 280a of the device 280 is parallel to the length 310a. In one or more exemplary embodiments, the recess 340 is sized such that the depth of the recess 340 is greater than a depth of the device 280 to prevent any portion of the device 280 from extending beyond the side 313. In one or more exemplary embodiments, the read range of the device 280 may be affected or changed when the device 280 contacts the component 50, and therefore the device 280 extends wholly within the recess 340 to prevent the device 280 from contacting the component 50.

Figure 8A:
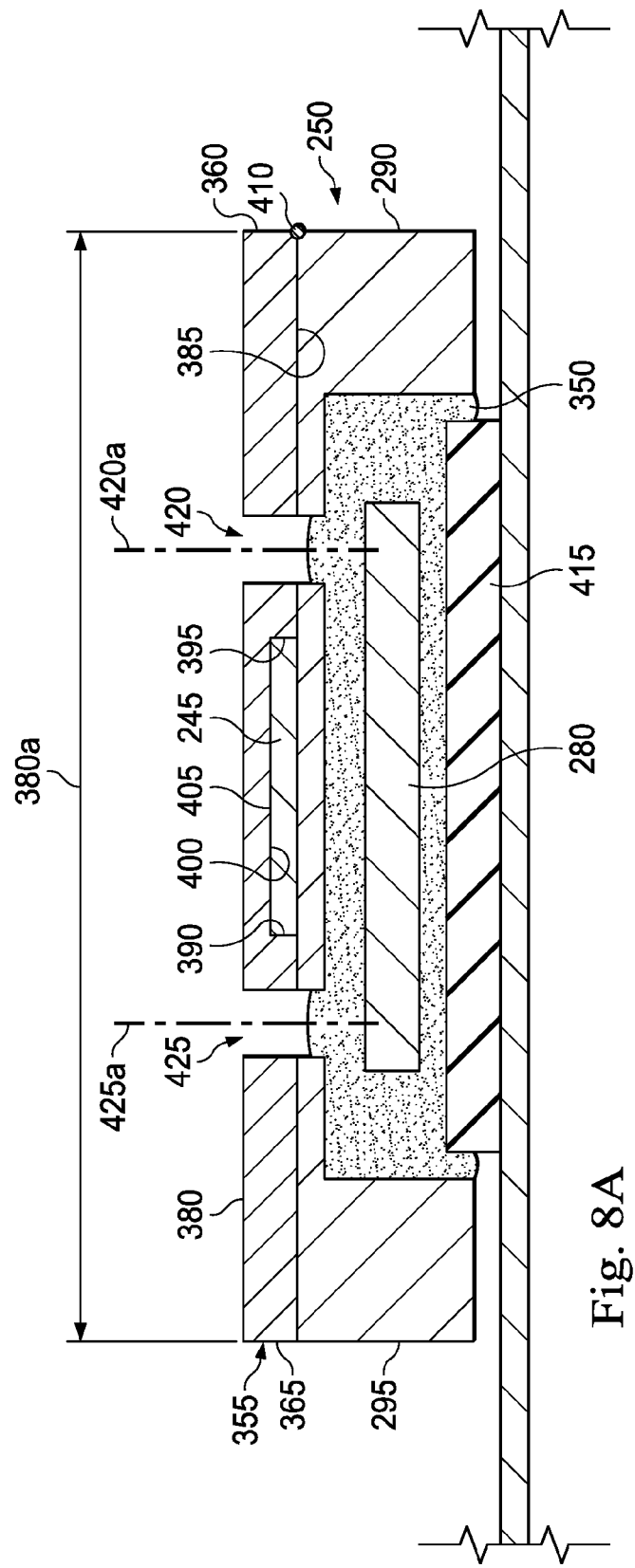
FIGS. 8A and 8B are sectional views of the identifier of FIGS. 5A and 5B, respectively, according to another exemplary embodiment.
Figure 8B:
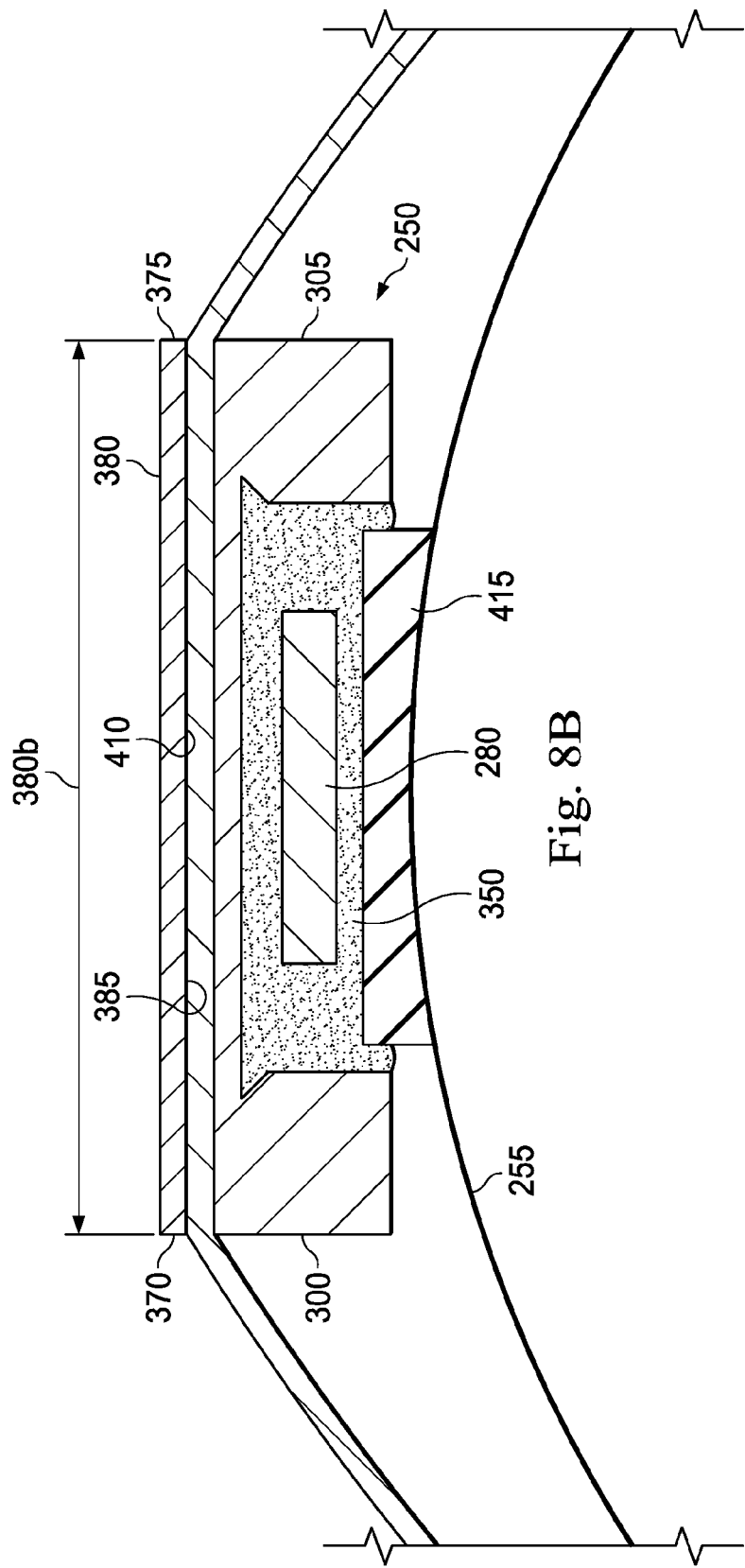

In an exemplary embodiment, as illustrated in FIGS. 8A and 8B, the carrier 250 is slidably attached to the band 245 via a cover 355. The cover 355 includes opposing sides 360 and 365 spaced in a parallel relation, opposing sides 370 and 375 spaced in a parallel relation and extending between the sides 360 and 365, and opposing sides 380 and 385 spaced in a parallel relation and extending between the sides 360, 365, 370, and 375. In an exemplary embodiment, the side 380 is a first exterior surface of the cover 355 defining a length 380a and a width 380b that is less than the length 380a. Further, the side 385 is a second exterior surface of the cover 355. The cover 355 also includes interior surfaces 390 and 395 spaced in a parallel relation, and an interior surface 400 extending between the surfaces 390 and 395. The spacing of surfaces in a parallel relation includes spacing of surfaces in a generally parallel relation (within 20 degrees). A channel 405 is formed into the second exterior surface of the cover 355, which is defined by the side 385, and extends toward the first exterior surface of the cover 355, which is defined by the side 380. Thus, the interior surfaces 390, 395, and 400 define the channel 405. The cover 355 is fixedly attached to the carrier 250 via at least one spot weld 410. In an exemplary embodiment, one or more of the respective sides 360, 365, 370, 375 of the cover 355 are fixedly attached to the respective sides 290, 295, 300, 305 of the carrier 250 via the spot weld 410 and/or one or more additional spot welds. In several exemplary embodiments, instead of, or in addition to the spot weld 410, one or more of the respective sides 360, 365, 370, 375 of the cover 355 are fixedly attached to the respective sides 290, 295, 300, 305 of the carrier 250 via an adhesive, at least one clip, at least one fastener, or any combination thereof. In an exemplary embodiment, the cover 355 is integrally formed with the carrier 250. The band 245 is maintained within the channel 405, between the side 310 of the carrier 250 and the side 385 of the cover 355. The carrier 250 is thus slidable on the band 245. In an exemplary embodiment, the band includes markers (not shown) to identify the location of the carrier 250 when mounted on the outer surface of the component 50. The carrier 250 may be secured at a position relative to the markers with a retaining member (not shown) such as, for example, removable clips, ridges, bands, etc., to prevent and/or limit movement of the carrier 250 in relation to the band 245. In an exemplary embodiment, the placement of the carrier 250 between the band 245 and an outer surface of the component 50 secures the carrier 250 at the position relative to the markers even if the retaining member fails. That is, the carrier 250 is also retained in the position relative to the markers by a friction fit between the band 245 and the component 50.

In an exemplary embodiment, the identifier 110 is an RFID tag, and the electronic identifying device 280 is an RFID chip, which is disposed in the recess 340. In an exemplary embodiment, and as illustrated in FIG. 9, the electronic identifying device 280 is passive and includes a first portion 280c, a second portion 280d, a third portion 280e, and an antenna 280f. In one or more exemplary embodiments, the first portion 280c includes a memory that is capable of storing data relating to a serial number or other identifier specific to the component 50 to which the identifier 110 is attached. In one or more exemplary embodiments, the device 280 is adapted so that the first portion 280c stores data that is written by a first party. In one or more exemplary embodiments, after the data relating to the serial number is stored in the memory of the first portion 280c, the data relating to the serial number may not be changed. In one or more exemplary embodiments, the data stored in the memory of the first portion 280c is readable by the RFID readers 225, 235, and 240. For example, the first party could write a serial number of the component 50 to the electronic identifying device 280, and that first party's serial number may not be later edited or otherwise changed. In one or more exemplary embodiments, the second portion 280d is a read-write section in which the first party may write data and the first party and/or a second party may read the data. In one or more exemplary embodiments, the third portion 280e is a read-write section in which the second party may write data and the first party and/or the second party may read the data. In one or more exemplary embodiments, each of the second portion 280d and the third portion 280e includes a memory that is capable of storing data. For example, the first portion 280c may contain the serial number of the component 50 to which the electronic identifying device 280 is adapted to be connected, the second portion 280d may contain information relating to the certification of the component 50, such as, for example, a due date of recertification of the component 50, and the third portion 280e may contain data that provides identification of the pump system 30 or the manifold trailer 20 of which the component 50 is a part. In an exemplary embodiment, the second party may read data relating to the certification date of the component 50 but not write to or edit the data relating to the certification date of the component 50. However, in some embodiments, the second party may write to the second portion 280d as well. Additionally, the second party may read and edit data relating to identification of the pump system 30 or the manifold trailer 20 of which the component 50 is a part or other data stored in the third portion 280e. In an exemplary embodiment, the first party may read data relating to the identification of the pump system 30 or the manifold trailer 20 of which the component 50 is a part or other data stored in the third portion 280e but not write to edit that data. However, in some embodiments, the first party may write to the third portion 280e as well. In an exemplary embodiment, the electronic identifying device 280 may include any number of sections, with each section associated with "read-only," "read-write," or "write once, read many" capabilities. In one or more exemplary embodiments, the antenna 280f is attached near the top of the device 280 or near an upper portion of the device 280. In an exemplary embodiment, the electronic identifying device 280 operates at a frequency band that includes frequencies commonly used in the United States as well as internationally. In one or more exemplary embodiments, the device has an upper exterior surface 280*g* and an opposing lower exterior surface 280*h*. In an exemplary embodiment, the device 280 is an RFID chip, which is available from Vizinex RFID, Allentown, Pa.

In an exemplary embodiment and referring back to FIGS. 5A, 5B, 6, 7, 8A, and 8B, the carrier 250 includes a pad 415 that is coupled or adhered to the device 280 by the material 350. The pad 415 may be coupled to the lower exterior surface 280*h* using the material 350. In one or more exemplary embodiments, a portion of the pad 415 extends within the recess 340 and another portion of the pad 415 extends beyond the side 313. The pad 415 may be a rubber pad that contacts the component 50 and provides insulation against vibration of the device 280 upon vibration of the component 50. The pad 415 may also deform to conform with the outer surface of the component 50. In one or more exemplary embodiments, the pad 415 is composed of an anti-vibration material. In one or more exemplary embodiments, the pad 415 prevents the block 285 and/or the device 280 from contacting the component 50 to reduce or prevent damage to the block 285 and/or the device 280 from vibration of the component 50.

In an exemplary embodiment, an opening 420 is formed into the first exterior surface of the carrier 250, which is defined by the side 310. In one or more exemplary embodiments, another opening 425 and the opening 420 extend through the side 310 and towards the recess 340. The openings 420 and 425 may be spaced apart by distance that is greater than or equal to the band width 245*d*. Generally, each of the openings 420 and 425 is formed into the first exterior surface of the carrier 250, which is defined by the side 310, and extends towards the second exterior surface of the carrier 250, which is defined by the side 313. In one or more exemplary embodiments, each of the openings 420 and 425 is a through-hole that extends from the side 310 and to the recess 340. Further, in those embodiments where the cover 355 slidably attaches the carrier 250 to the band 245, each of the openings 420 and 425 extends through the cover 355 from the first exterior surface of the cover 355, which is defined by the side 380, to the second exterior surface of the cover 355, which is defined by the side 385. The opening 420 defines a longitudinal axis 420*a* and the opening 425 defines a longitudinal axis 425*a*, with at least one of the longitudinal axes 420*a* and 425*a* intersecting with the device 280. In an exemplary embodiment, the device 280 is accommodated within the recess 340 so that at least one of the longitudinal axes 420*a* and 425*a* intersects with the antenna 280*f*. The openings 420 and 425 facilitate detection of the device 280 by any one of the RFID readers 225, 235, and 240, as the RFID readers 225, 235, and 240 are capable of scanning or reading the device 280 through the openings 420 and 425. The material 350 may extend within at least a portion of the openings 420 and 425. In one or more exemplary embodiments, the openings 420 and 425 may be one of any number of openings formed in the side 310 of the block 285. The size and number of the openings are adapted to enable the device 280 to be read by any one of the RFID readers 225, 235, and 240 while the identifier 110 is attached to the component 50.

Referring back to FIGS. 2, 3, and 6, the carrier 250 may be fixedly attached to the band 245 via at least one spot weld 430. In an exemplary embodiment, the side 310 of the carrier 250 is fixedly attached to the band 245 via the spot weld 430 and one or more additional spot welds. In several exemplary embodiments, instead of, or in addition to the spot weld 430, the side 310 of the carrier 250 is fixedly attached to the band 245 via an adhesive, at least one fastener, or any combination thereof. In an exemplary embodiment, the placement of the carrier 250 between the band 245 and an outer surface of the component 50 secures the carrier 250 to the component 50 even if the weld 430 fails. That is, the carrier 250 is also attached to the component 50 by a friction fit between the band 245 and the component 50.

In an exemplary embodiment, each of the identifiers 115-165 is identical to the identifier 110 and therefore will not be described in further detail. In an exemplary embodiment, one or more of the identifiers 115-165 are coupled to the components 55-105, respectively, using respective bands that are similar to the band 245 and in a manner similar to the manner by which the identifier 110 is coupled to the tubular member 255. In an exemplary embodiment, one or both of the identifiers 170 and 175 are coupled to the fluid lines 22 using respective bands that are similar to the band 245 and in a manner similar to the manner by which the identifier 110 is coupled to the tubular member 255.

With continuing reference to FIGS. 1A, 1B, 2-4, 5A, 5B, 6, 7, 8A, 8B, and 9, the operation of the system 10 may be implemented in whole or in part using the computer 205, one or more of the ID readers 225, 235 and 240, or any combination thereof. As an example, aspects of the operation of the system 10 will be described with respect to the identifier 110 and the component 50. However, operational aspects with respect to any of the identifiers 115-175 and the components 55-105 (or the fluid lines 22) are identical to the operational aspects with respect to the identifier 110 and the component 50, but for replacing the identifier 110 with one of the identifiers 115-175, and replacing the component 50 with one of the components 55-105 or the fluid lines 22.

In operation, and with continuing reference to FIGS. 1A, 1B, 2-4, 5A, 5B, 6, 7, 8A, 8B, and 9, the component 50 is identified by receiving information or data that identifies the component 50. More particularly, the identifier 110 is coupled to the component 50 in accordance with the foregoing, with the band 245 engaging the component 50. The electronic identifying device 280 is detected using one of the ID readers 225, 235, and 240, thereby identifying the component 50. For example, the ID reader 225 sends at least one signal to the electronic identifying device 280 and then receives response signal(s) from the electronic identifying device 280, the response signal(s) including identification information, such as, for example, a stock number or unique tag serial number that identifies the component 50. This identification information and/or data associated therewith are transmitted from the ID reader 225 to the computer 205. In an exemplary embodiment, the transmitted information and/or data is stored in the database 220.

In an exemplary embodiment, the component 50 is the tubular member 255 and the identifier 110 is coupled to the tubular member 255 in accordance with the foregoing, with the band 245 extending circumferentially around the tubular member 255 and the opposing end portions 245*a* and 245*b* being coupled together so that relative movement between the band 245 and the tubular member 255 is prevented. The prevention of relative movement between the band 245 and the tubular member 255, the fixed attachment of the carrier 250 to the band 245 and thus the fixed spacing 275 between the carrier 250 and the end portion 245*a* of the band 245, and the fixed attachment of the electronic identifying device 280 to the carrier 250, fixes the location of the electronic identifying device 280 relative to the tubular member 255, thereby facilitating detection of the electronic identifying device 280 and thus identification of the tubular member 255 and, if applicable, the identification of the component 50 of which the tubular member 255 is a part.

In an exemplary embodiment, the fixed location of the electronic identifying device 280, relative to each of the band 245 and the tubular member 255, facilitates identification of the tubular member 255 because the electronic identifying device 280 is permanently at a position that is consistently, readily and easily accessible to, for example, the ID reader 225. As a result, an operator of the ID reader 225 can place the ID reader 225 at a predetermined position at which the detection of the electronic identifying device 280 using the ID reader 225 is ensured and repeatable. Thus, the need for the operator of the ID reader 225 to search for the electronic identifying device 280 on the tubular member 255, and/or manually place the ID reader 225 in different positions until the ID reader 225 is able to detect the electronic identifying device 280, is eliminated. As a result, the identification of all of the components in the system 10 can be quickly and efficiently accomplished.

In an exemplary embodiment, the fixed location of the electronic identifying device 280, relative to each of the band 245 and the tubular member 255, facilitates identification of the tubular member 255 because the electronic identifying device 280 is permanently at a position that is consistently, readily and easily accessible to an automatic or robotic system that includes, for example, the ID reader 225 and/or equipment similar thereto; as a result, the automatic or robotic system can place the ID reader 225 and/or equipment similar thereto at a predetermined position at which the detection of the electronic identifying device 280 is ensured and repeatable.

As noted above, although aspects of the operation of the system 10 have been described above in connection with the identifier 110 and the component 50, the corresponding operational aspects with respect to any of the identifiers 115-165 and the components 55-105 (or the fluid lines 22) are identical to that in connection with the identifier 110 and the component 50, but for replacing the identifier 110 with one of the identifiers 115-165 and replacing the component 50 with one of the components 55-165 or the fluid lines 22.

Figure 12:
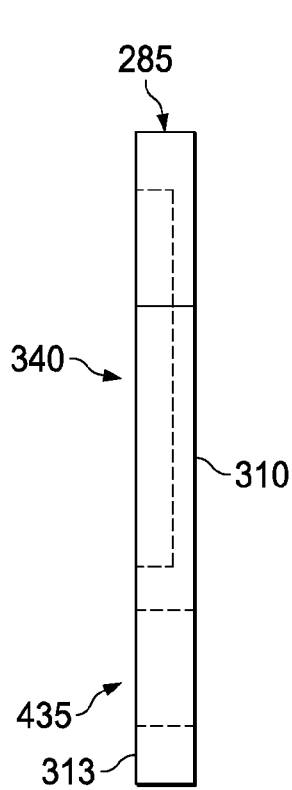
FIG. 12 is a sectional view of the identifier of FIG. 10, according to an exemplary embodiment.

In an exemplary embodiment, the identifier 110 may be altered in a variety of ways. For example, and as illustrated in FIGS. 10-12, the carrier 250 may include the block 285 that forms the recess 340. However, instead of an opening 420 that extends from the side 310 to the recess 340, the block 285 may include an opening 435 that extends from the side 310 to the side 313 to form a through-hole through the block 285. Thus, the carrier 250 may be attached to the component 50 using a screw or other fastener extending through the opening 435.

Figure 13:
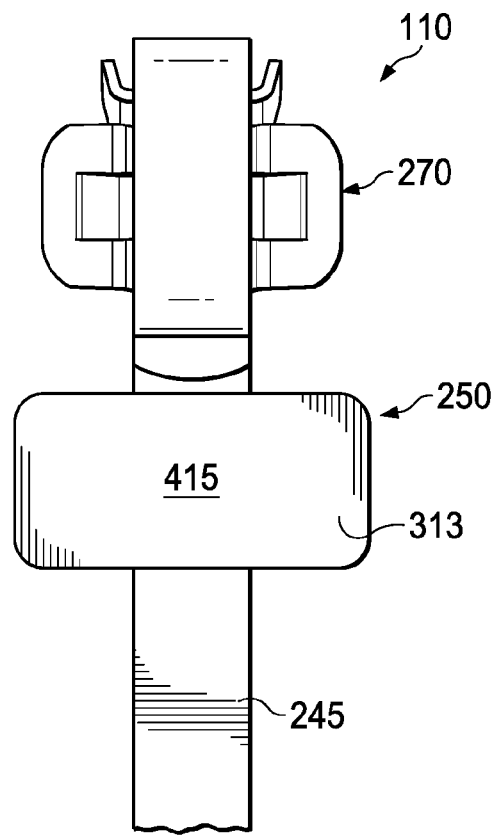
FIG. 13 is a bottom view of the identifier of FIG. 3, according to another exemplary embodiment.

FIG. 13 illustrates a bottom view of a portion of the identifier 110 of FIG. 3, according to another exemplary embodiment. As shown in FIG. 13, the pad 415 extends over the side 313 and may be coupled to the side 313 of the block 285 and/or the device 280.

Figure 14:
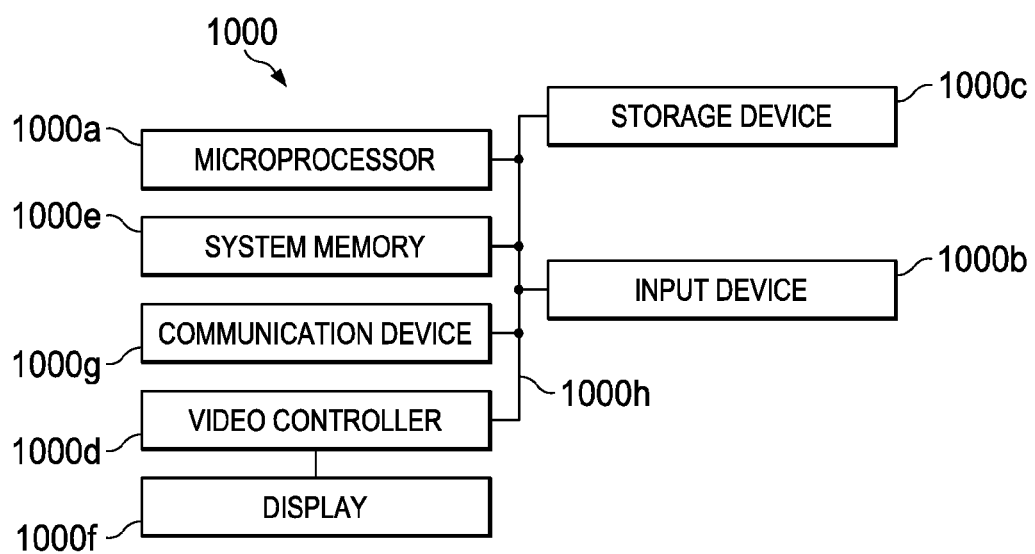
FIG. 14 is a diagrammatic illustration of a node for implementing one or more exemplary embodiments of the present disclosure, according to an exemplary embodiment.

In an exemplary embodiment, as illustrated in FIG. 14 with continuing reference to FIGS. 1A, 1B, 2-4, 5A, 5B, 6, 7, 8A, 8B, and 9-13, an illustrative node 1000 for implementing one or more embodiments of one or more of the above-described networks, elements, methods and/or steps, and/or any combination thereof, is depicted. The node 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In several exemplary embodiments, the communication device 1000g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones, and cell phones.

In several exemplary embodiments, one or more of the computer 205 and the ID readers 225, 235, and 240, and/or one or more components thereof, are, or at least include, the node 1000 and/or components thereof, and/or one or more nodes that are substantially similar to the node 1000 and/or components thereof. In several exemplary embodiments, one or more of the above-described components of one or more of the node 1000, the computer 205 and the ID readers 225, 235, and 240, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 98, and/or one or more portions thereof, may be designed to work on any specific architecture. In an exemplary embodiment, one or more portions of the network 98 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 215, the database 220, the system memory 1000e, and/or any combination thereof, may be executed by a processor to cause the processor to carry out or implement in whole or in part the operation of the system 10. In several exemplary embodiments, such a processor may include one or more of the processor 210, the processor 1000a, and/or any combination thereof. In several exemplary embodiments, such a processor may execute the plurality of instructions in connection with a virtual computer system.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of." A corresponding meaning is to be attributed to the corresponding words "comprise," "comprised," and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An apparatus adapted to be connected to a component that is part of a pump system or a manifold trailer, the apparatus comprising:
   a block that defines a first exterior surface and an opposing second exterior surface and that comprises:
      a recess that is formed in the first exterior surface and that extends towards the second exterior surface; and
      a first opening that is formed in the second exterior surface;
      wherein the first opening is a through-hole that extends from the second exterior surface to the recess and that defines a first longitudinal axis;
   an electronic identifying device at least partially accommodated within the recess, the electronic identifying device comprising:
      a first portion having data stored thereon that provides identification of the component to which the apparatus is adapted to be connected; and
      an antenna operably coupled to the first portion;
      wherein the electronic identifying device is accommodated within the recess so that the first longitudinal axis of the first opening intersects with the antenna to facilitate detection of the electronic identifying device and thus identification of the component; and
   a band having a band length;
      wherein the second exterior surface of the block has a length and a width;
      wherein the length of the second exterior surface is greater than the width; and
      wherein the block is attached to the band so that the length of the second exterior surface is perpendicular to the band length.

2. The apparatus of claim 1,
   wherein the electronic identifying device further comprises a second portion having data stored thereon that provides one of:
      information associated with certification of the component; and
      identification of the pump system or the manifold trailer of which the component is a part.

3. The apparatus of claim 2,
   wherein the electronic identifying device further comprises a third portion having data stored thereon that provides the other one of:
      the information associated with certification of the component; and
      the identification of the pump system or the manifold trailer of which the component is a part.

4. The apparatus of claim 3,
   wherein the electronic identifying device comprises an RFID chip;

wherein the second portion is adapted to store data that is written by a first party and that is read by the first party; and wherein the third portion is adapted to store data that is written by a second party and that is read by the second party.

5. The apparatus of claim 4, wherein the second portion is adapted so that the data stored in the second portion is capable of being read by the second party but cannot be written by the second party; and wherein the third portion is adapted so that the data stored in the third portion is capable of being read by the first party but cannot be written by the first party.

6. The apparatus of claim 2, wherein the antenna is operably coupled to each of the first and second portions.

7. The apparatus of claim 1, further comprising:

a pad extending beyond the first exterior surface and contacting the component to provide insulation against vibration of the electronic identifying device upon vibration of the component;

wherein the pad prevents the block and/or the electronic identifying device from contacting the component to reduce or prevent damage to the block and/or the electronic identifying device from vibration of the component.

8. The apparatus of claim 1, wherein the component is a tubular member through which a fluid is adapted to flow;

wherein the block forms a portion of a carrier;

wherein the electronic identifying device is configured to be disposed between the band and the tubular member;

wherein the carrier comprises a pad configured to be disposed between the outer surface of the tubular member and the electronic identifying device; and wherein the pad is anti-vibration insulation.

9. The apparatus of claim 8, wherein the second exterior surface of the block is slidably attached to the band via a cover that defines a first exterior surface and an opposing second exterior surface, the cover being fixedly attached to the block;

wherein the cover comprises a channel formed in the first exterior surface and that extends towards the second exterior surface; and wherein the band is maintained within the channel, between the first exterior surface of the cover and the second exterior surface of the block.

10. The apparatus of claim 8, wherein the electronic identifying device comprises an RFID chip; and wherein the RFID chip comprises the antenna and the first portion.

11. The apparatus of claim 8, wherein the carrier further comprises a material disposed in the recess to facilitate the fixed attachment of the electronic identifying device to the block.

12. The apparatus of claim 8, wherein the block further comprises:

a first and a second interior surface that are spaced in parallel relation and that are defined by the recess; and an interior shoulder formed within at least one of the first and second interior surfaces; and wherein the electronic identifying device is spaced from each of the first and second interior surfaces.

13. The apparatus of claim 1, wherein the block further comprises a second opening that is formed in the second exterior surface;

wherein the second opening is a through-hole that extends from the second exterior surface to the recess and that defines a second longitudinal axis;

wherein the electronic identifying device is accommodated within the recess so that the second longitudinal axis of the second opening intersects with the antenna to facilitate detection of the electronic identifying device and thus identification of the component; and wherein the block is attached to the band to so that the band is positioned between the first and second openings.

14. An apparatus, comprising:

a carrier comprising a block that defines a first exterior surface and an opposing second exterior surface, the block comprising:

a recess that is formed in the first exterior surface and that extends towards the second exterior surface; and a first opening that is formed in the second exterior surface and that extends towards the recess, the opening defining a first longitudinal axis;

an electronic identifying device fixedly attached to the block and at least partially accommodated within the recess so that the first longitudinal axis of the first opening intersects the electronic identifying device; and a band having a band length;

wherein the second exterior surface of the block has a length and a width;

wherein the length of the second exterior surface is greater than the width;

wherein the block is attached to the band so that the length of the second exterior surface is perpendicular to the band length;

wherein the electronic identifying device comprises an antenna; and wherein the electronic identifying device is accommodated within the recess so that the first longitudinal axis of the first opening intersects the antenna to facilitate detection of the electronic identifying device.

15. The apparatus of claim 14, wherein the block further comprises:

a first and a second interior surface that are spaced in parallel relation and that are defined by the recess; and an interior shoulder formed within at least one of the first and second interior surfaces;

wherein the block further comprises a channel defined by the interior shoulder; and wherein the carrier further comprises a hardened material disposed about the electronic identifying device and within the channel to structurally secure the hardened material and the electronic identifying device to the block;

wherein the carrier further comprises a pad connected to the electronic identifying device; and wherein the pad is an anti-vibration insulation.

16. The apparatus of claim 14, wherein the first opening is a through-hole that extends from the second exterior surface to the recess.

17. The apparatus of claim 16, wherein the block further comprises a second opening that is formed in the second exterior surface;

wherein the second opening is a through-hole that extends from the second exterior surface to the recess and that defines a second longitudinal axis;

wherein the electronic identifying device is accommodated within the recess so that the second longitudinal axis of the second opening intersects with the antenna to facilitate detection of the electronic identifying device and thus identification of the component; and wherein the block is attached to the band to so that the band is positioned between the first and second openings.

18. A method for securing an electronic identifying device to a component that is part of a pump system or a manifold trailer, the method comprising:

attaching a carrier to a band, the carrier comprising a block that defines a first exterior surface and an opposing second exterior surface;

wherein the block comprises:
   a recess that is formed in the first exterior surface and that extends towards the second exterior surface; and
   a first opening that is formed in the second exterior surface and that extends towards the recess, the first opening defining a first longitudinal axis; and attaching the electronic identifying device fixedly to the block so that the electronic identifying device is at least partially accommodated within the recess of the block so that the first longitudinal axis of the first opening intersects the electronic identifying device; and securing the band circumferentially around the component so that relative movement between the band and the component is prevented or reduced;

wherein, when the band is secured circumferentially around the component, the electronic identifying device is disposed between the band and the component;

wherein the band has a length, wherein the second exterior surface of the block has a length and a width;

wherein the length of the second exterior surface is greater than the width;

wherein the block is attached to the band so that the length of the second exterior surface is perpendicular to the band length;

wherein the electronic identifying device comprises an antenna; and wherein attaching the electronic identifying device fixedly to the block comprises accommodating the electronic identifying device within the recess so that the first longitudinal axis of the first opening intersects the antenna to facilitate detection of the electronic identifying device.

19. The method of claim 18, wherein attaching the carrier to the band comprises slidably attaching the second exterior surface of the block to the band via a cover that defines a first exterior surface and an opposing second exterior surface, the cover being fixedly attached to the block;

wherein the cover comprises a channel formed in the first exterior surface and that extends towards the second exterior surface;

wherein, when the second exterior surface of the block is slidably attached to the band via the cover, the band is maintained within the channel, between the first exterior surface of the cover and the second exterior surface of the block;

wherein the first opening that is formed in the second exterior surface extends towards the recess; and wherein the first opening is a through-hole that extends from the second exterior surface to the recess.

20. The method of claim 19, wherein the block further comprises a second opening that is formed in the second exterior surface;

wherein the second opening is a through-hole that extends from the second exterior surface to the recess and that defines a second longitudinal axis;

wherein the electronic identifying device is accommodated within the recess so that the second longitudinal axis of the second opening intersects with the antenna to facilitate detection of the electronic identifying device and thus identification of the component; and wherein the block is attached to the band to so that the band is positioned between the first and second openings.

21. The method of claim 18, wherein attaching the electronic identifying device fixedly to the block comprises:

placing a material in the recess to facilitate the fixed attachment of the electronic identifying device to the block; and adhering the electronic identifying device to the material disposed within the recess;

wherein attaching the electronic identifying device fixedly to the block further comprises adhering a pad to the electronic identifying device with the material, the pad comprising an anti-vibration insulation; and wherein, when the band is secured circumferentially around the component, the pad is disposed between the electronic identifying device and the outer surface of the component.

22. The method of claim 18, wherein the block further comprises:
   a first and a second interior surface that are spaced in parallel relation and that are defined by the recess; and
   an interior shoulder formed within at least one of the first and second interior surfaces; and wherein, when the electronic identifying device is fixedly attached to the block, the electronic identifying device is spaced from each of the first and second interior surfaces.

\* \* \* \* \*